(12) United States Patent
Weissenborn et al.

(10) Patent No.: US 7,340,833 B2
(45) Date of Patent: Mar. 11, 2008

(54) BUMPER SYSTEM WITH ENERGY ABSORBER

(75) Inventors: Mark Weissenborn, Grand Rapids, MI (US); Darin Evans, Wixom, MI (US); Robert Weykamp, Grand Haven, MI (US); David Powell, Grand Haven, MI (US)

(73) Assignee: Netshape Energy Management LLC, Novi, MI (US)

( * ) Notice: Subject to any disclaimer, the term of this patent is extended or adjusted under 35 U.S.C. 154(b) by 0 days.

(21) Appl. No.: 11/612,708

(22) Filed: Dec. 19, 2006

(65) Prior Publication Data

US 2007/0085230 A1    Apr. 19, 2007

Related U.S. Application Data

(60) Division of application No. 11/313,325, filed on Dec. 21, 2005, now Pat. No. 7,172,227, which is a continuation of application No. 10/694,278, filed on Oct. 27, 2003, now Pat. No. 7,052,056, which is a division of application No. 10/163,586, filed on Jun. 6, 2002, now Pat. No. 6,672,635.

(51) Int. Cl.
  *B21D 53/88* (2006.01)
  *B60R 19/18* (2006.01)
  *B60R 19/22* (2006.01)

(52) U.S. Cl. .................. 29/897.2; 29/527.1; 293/120; 293/132

(58) Field of Classification Search ............... 29/897.2, 29/527.1; 293/109, 110, 120, 132
See application file for complete search history.

(56) References Cited

U.S. PATENT DOCUMENTS 831,755 A    9/1906    Husham (Continued)

FOREIGN PATENT DOCUMENTS

DE    3343709    6/1984

(Continued)

OTHER PUBLICATIONS

Exhibit A (2001) includes four pictures of a prior art vehicle bumper system on a Ford Focus model vehicle, which includes a steel beam and an energy absorber that wraps around ends of the beam. The energy absorber includes a lower-density black foam body and has several higher-density white foam blocks inset into an inner surface of the black foam. (Note: Photo 1 shows an "extra" energy absorber loosely setting on a rear bumper system of a Ford Focus, the "extra" energy absorber being reversed to show its inner surface with the white foam blocks exposed.).

*Primary Examiner*—David P. Bryant
*Assistant Examiner*—Christopher M Koehler
(74) *Attorney, Agent, or Firm*—Price, Heneveld, Cooper, DeWitt & Litton, LLP

(57) ABSTRACT

A bumper system includes a bumper beam having a face and ends, and an energy absorber mounted on the face. The energy absorber has a one-piece injection-molded non-foam piece with box sections and interconnecting straps, and a one-piece or multi-piece foam component securely insert-molded onto the injection-molded non-foam piece. Different foam molds can be used to form differently shaped front surfaces on the foam component. By this arrangement, different energy absorbing systems are provided for vehicles, such as to satisfy the need for different styling and shapes, while still using the same non-foam piece. By this arrangement, the energy absorber is a single unit that can be handled and attached to the bumper beam. At the same time, capital investment in molding dies and tooling is reduced.

5 Claims, 7 Drawing Sheets

U.S. PATENT DOCUMENTS

| | | | |
|---|---|---|---|
| 1,247,569 A | 11/1917 | Palmer | |
| 1,362,439 A | 12/1920 | Roberts | |
| RE15,255 E | 12/1921 | Limacher | |
| 1,429,061 A | 9/1922 | Coe | |
| 1,499,986 A | 7/1924 | Kirsch | |
| 1,927,442 A | 9/1933 | Laufle | |
| 1,952,545 A | 3/1934 | Gotshall | |
| 2,371,671 A | 3/1945 | Blount et al. | |
| 2,566,605 A | 9/1951 | Ekornaas | |
| 2,606,755 A | 8/1952 | Samuels | |
| 2,685,269 A | 8/1954 | Manson | |
| 2,734,407 A | 2/1956 | Smith | |
| 3,392,566 A | 7/1968 | Sporck | |
| 3,596,963 A | 8/1971 | Phillips | |
| 3,762,195 A | 10/1973 | Kitanosono et al. | |
| 3,768,850 A | 10/1973 | Barton et al. | |
| 3,777,438 A | 12/1973 | Brown | |
| 3,827,740 A | 8/1974 | Golze et al. | |
| 3,860,279 A | 1/1975 | Hulten | |
| 3,884,517 A | 5/1975 | Davidson | |
| 3,902,748 A | 9/1975 | Bank et al. | |
| 3,938,841 A * | 2/1976 | Glance et al. | 293/120 |
| 3,989,292 A | 11/1976 | Bank et al. | |
| 4,013,317 A | 3/1977 | Reidelbach et al. | |
| 4,022,505 A * | 5/1977 | Saczawa, Jr. | 293/120 |
| 4,061,384 A | 12/1977 | Montgomery et al. | |
| 4,066,285 A | 1/1978 | Hall et al. | |
| 4,095,831 A | 6/1978 | Hagiwara et al. | |
| 4,111,478 A | 9/1978 | Pompei et al. | |
| 4,165,113 A | 8/1979 | Casse | |
| 4,186,915 A | 2/1980 | Zeller et al. | |
| 4,193,621 A | 3/1980 | Peichl et al. | |
| 4,221,413 A | 9/1980 | Bonnetain | |
| 4,225,167 A | 9/1980 | Buettner et al. | |
| 4,233,833 A | 11/1980 | Balinski | |
| 4,241,146 A | 12/1980 | Sivachenko et al. | |
| 4,248,072 A | 2/1981 | Hasegawa et al. | |
| 4,252,355 A | 2/1981 | Goupy et al. | |
| 4,291,564 A | 9/1981 | Muckli | |
| 4,317,350 A | 3/1982 | Sivachenko et al. | |
| 4,320,913 A | 3/1982 | Kuroda | |
| 4,333,674 A | 6/1982 | Buettner et al. | |
| 4,361,352 A | 11/1982 | Wakamatsu | |
| 4,386,799 A | 6/1983 | Molnar | |
| 4,413,856 A | 11/1983 | McMahan et al. | |
| 4,422,680 A * | 12/1983 | Goupy | 293/122 |
| 4,427,189 A | 1/1984 | Kimura et al. | |
| 4,433,565 A | 2/1984 | Preller | |
| 4,466,646 A | 8/1984 | Delmastro et al. | |
| 4,578,979 A | 4/1986 | Abe et al. | |
| 4,592,580 A | 6/1986 | Stanganelli et al. | |
| 4,684,166 A | 8/1987 | Kanodia | |
| 4,714,287 A | 12/1987 | Merkle | |
| 4,715,630 A | 12/1987 | Manning | |
| 4,783,104 A | 11/1988 | Watanabe et al. | |
| 4,796,946 A | 1/1989 | Wilson et al. | |
| 4,811,979 A | 3/1989 | Peter et al. | |
| 4,856,833 A | 8/1989 | Beekman | |
| 4,862,666 A | 9/1989 | Kero | |
| 4,940,270 A | 7/1990 | Yamazaki et al. | |
| 4,941,701 A | 7/1990 | Loren | |
| 4,978,562 A | 12/1990 | Wycech | |
| 4,988,137 A | 1/1991 | Fleming | |
| 5,005,887 A | 4/1991 | Kelman | |
| 5,040,399 A | 8/1991 | Knapper et al. | |
| 5,056,840 A | 10/1991 | Eipper et al. | |
| 5,067,759 A | 11/1991 | Fleming | |
| 5,092,512 A | 3/1992 | Sturrus et al. | |
| 5,100,187 A | 3/1992 | Loren | |
| 5,106,137 A | 4/1992 | Curtis | |
| 5,124,186 A | 6/1992 | Wycech | |
| 5,139,297 A | 8/1992 | Carpenter et al. | |
| 5,154,462 A | 10/1992 | Carpenter | |
| 5,180,629 A | 1/1993 | Terada et al. | |
| 5,219,197 A | 6/1993 | Rich et al. | |
| 5,232,261 A | 8/1993 | Kuroda et al. | |
| 5,277,469 A | 1/1994 | Klippel | |
| 5,290,078 A * | 3/1994 | Bayer et al. | 293/120 |
| 5,340,178 A | 8/1994 | Stewart et al. | |
| 5,385,375 A | 1/1995 | Morgan et al. | |
| 5,404,974 A | 4/1995 | Thum et al. | |
| 5,407,239 A | 4/1995 | Arai et al. | |
| 5,425,561 A | 6/1995 | Morgan | |
| 5,431,464 A * | 7/1995 | Jones et al. | 293/121 |
| 5,540,016 A | 7/1996 | Clausen | |
| 5,545,022 A | 8/1996 | Rosasco | |
| 5,545,361 A | 8/1996 | Rosasco | |
| 5,560,662 A | 10/1996 | Apgar, Jr. et al. | |
| 5,672,405 A | 9/1997 | Plank, Jr. et al. | |
| 5,746,419 A | 5/1998 | McFadden et al. | |
| 5,756,167 A | 5/1998 | Tamura et al. | |
| 5,785,376 A | 7/1998 | Nees et al. | |
| 5,799,991 A * | 9/1998 | Glance | 293/121 |
| 5,813,718 A | 9/1998 | Masuda et al. | |
| 5,857,734 A | 1/1999 | Okamura et al. | |
| 5,927,778 A * | 7/1999 | Uytterhaeghe et al. | 293/120 |
| 5,997,058 A | 12/1999 | Pedersen | |
| 6,000,738 A | 12/1999 | Stewart et al. | |
| 6,003,274 A | 12/1999 | Wycech | |
| 6,003,912 A | 12/1999 | Schonhoff et al. | |
| 6,042,163 A | 3/2000 | Reiffer | |
| 6,138,429 A | 10/2000 | Baumgaertner | |
| 6,165,588 A | 12/2000 | Wycech | |
| 6,168,226 B1 | 1/2001 | Wycech | |
| 6,179,353 B1 | 1/2001 | Heatherington et al. | |
| 6,217,089 B1 | 4/2001 | Goto et al. | |
| 6,276,105 B1 | 8/2001 | Wycech | |
| 6,318,775 B1 | 11/2001 | Heatherington et al. | |
| 6,406,081 B1 | 6/2002 | Mahfet et al. | |
| 6,428,064 B1 | 8/2002 | Frederick | |
| 6,575,510 B2 | 6/2003 | Weissenborn | |
| 6,609,740 B2 | 8/2003 | Evans | |
| 6,644,701 B2 | 11/2003 | Weissenborn | |
| 6,663,150 B1 | 12/2003 | Evans | |
| 6,672,635 B2 | 1/2004 | Weissenborn | |
| 6,685,243 B1 | 2/2004 | Evans | |
| 6,688,661 B2 | 2/2004 | Yamamoto | |
| 6,755,452 B2 | 6/2004 | Cate et al. | |
| 6,758,507 B2 * | 7/2004 | Tarahomi et al. | 293/120 |
| 6,793,256 B2 | 9/2004 | Carley et al. | |
| 6,817,638 B1 | 11/2004 | Choi et al. | |
| 6,886,873 B2 * | 5/2005 | Weykamp et al. | 293/133 |

FOREIGN PATENT DOCUMENTS

| | | |
|---|---|---|
| EP | 563548 | 10/1993 |
| FR | 40075 | 4/1932 |
| FR | 766186 | 6/1934 |
| GB | 645721 | 11/1950 |
| GB | 2027516 | 2/1980 |
| JP | 355102746 | 8/1980 |
| JP | 359006152 | 1/1984 |
| JP | 169350 | 7/1986 |
| JP | 172603 | 8/1986 |
| JP | 66008 | 3/1989 |
| JP | 240322 | 9/1989 |
| JP | 227750 | 10/1991 |
| JP | 403266743 | 11/1991 |
| JP | 24491 | 2/1993 |
| JP | 6286536 | 10/1994 |
| SU | 1382693 | 3/1988 |

* cited by examiner

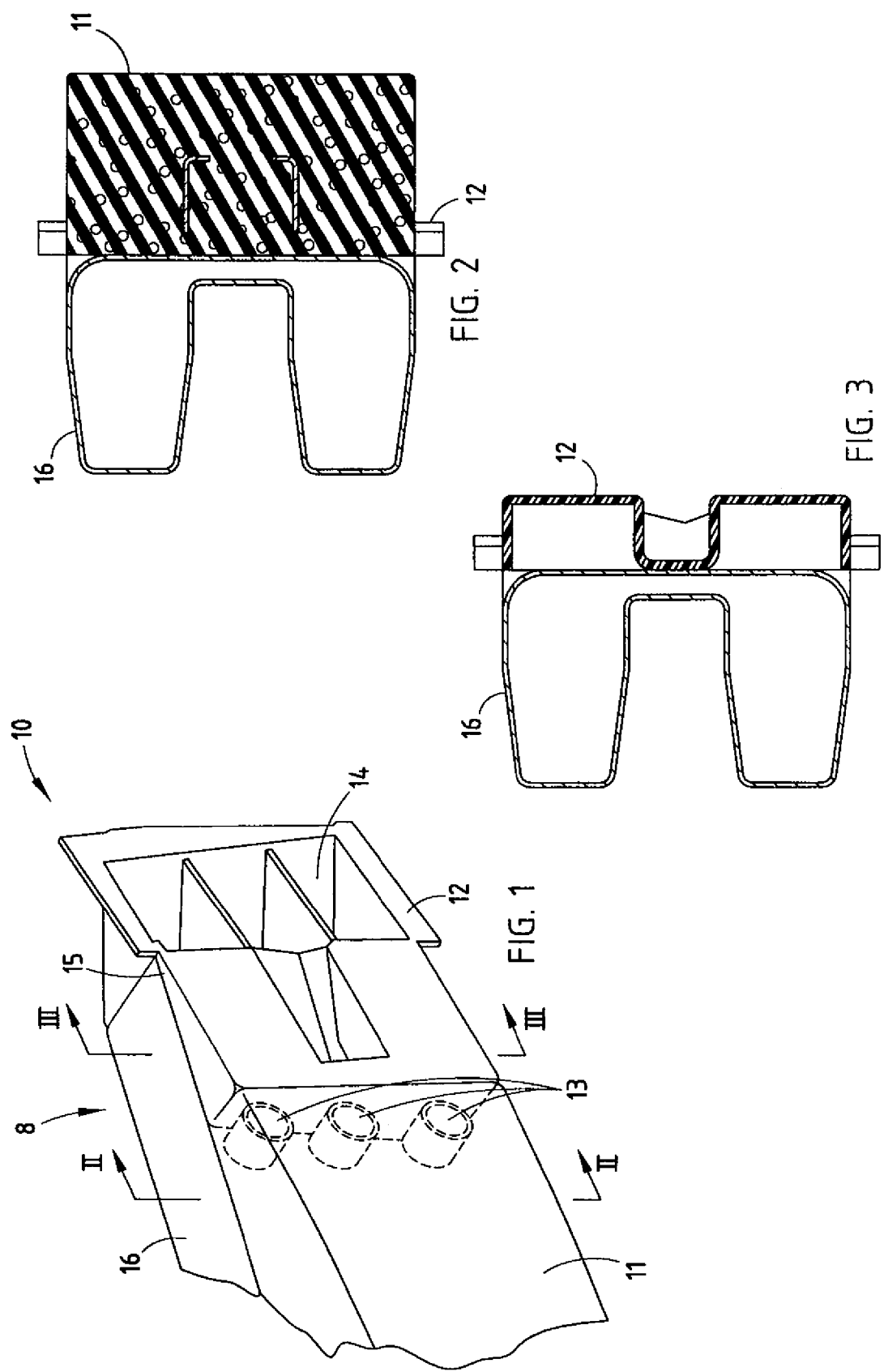

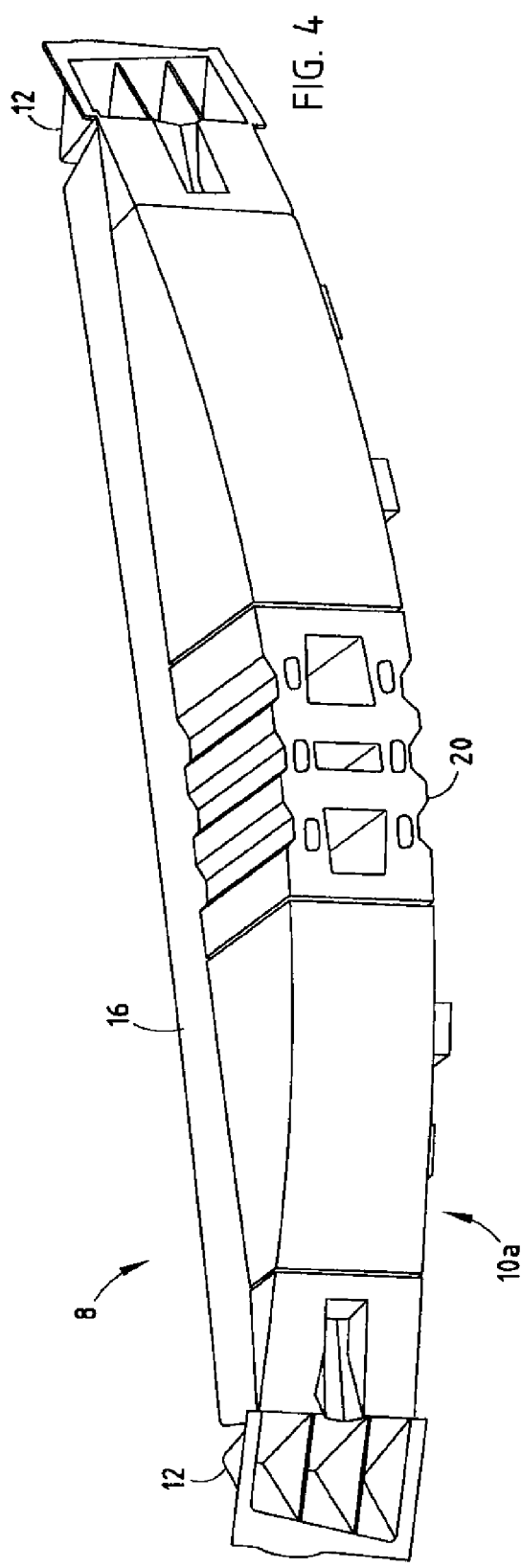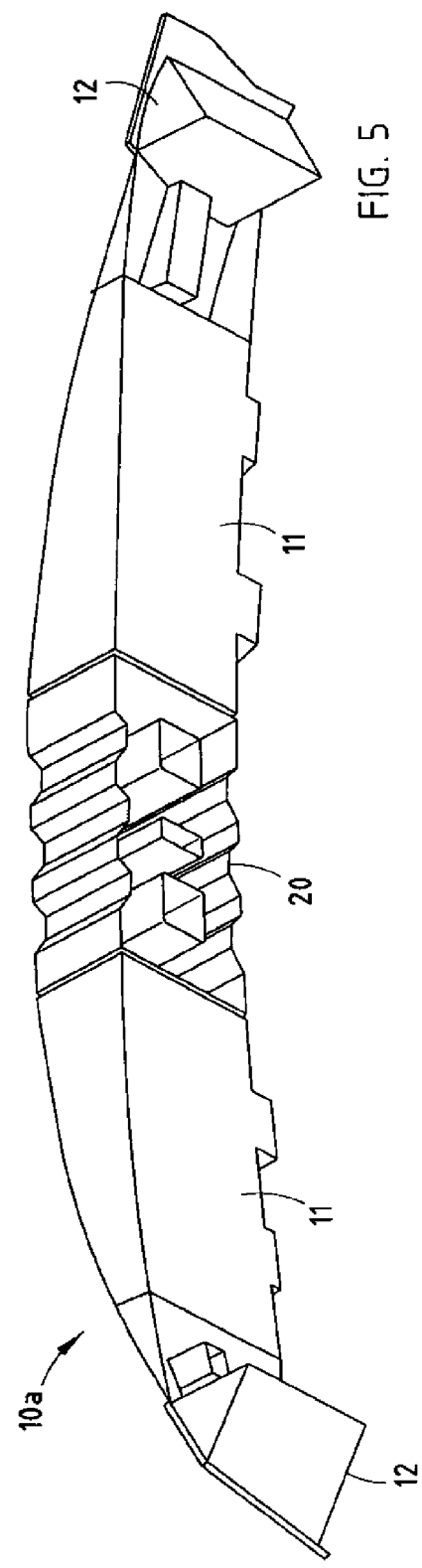

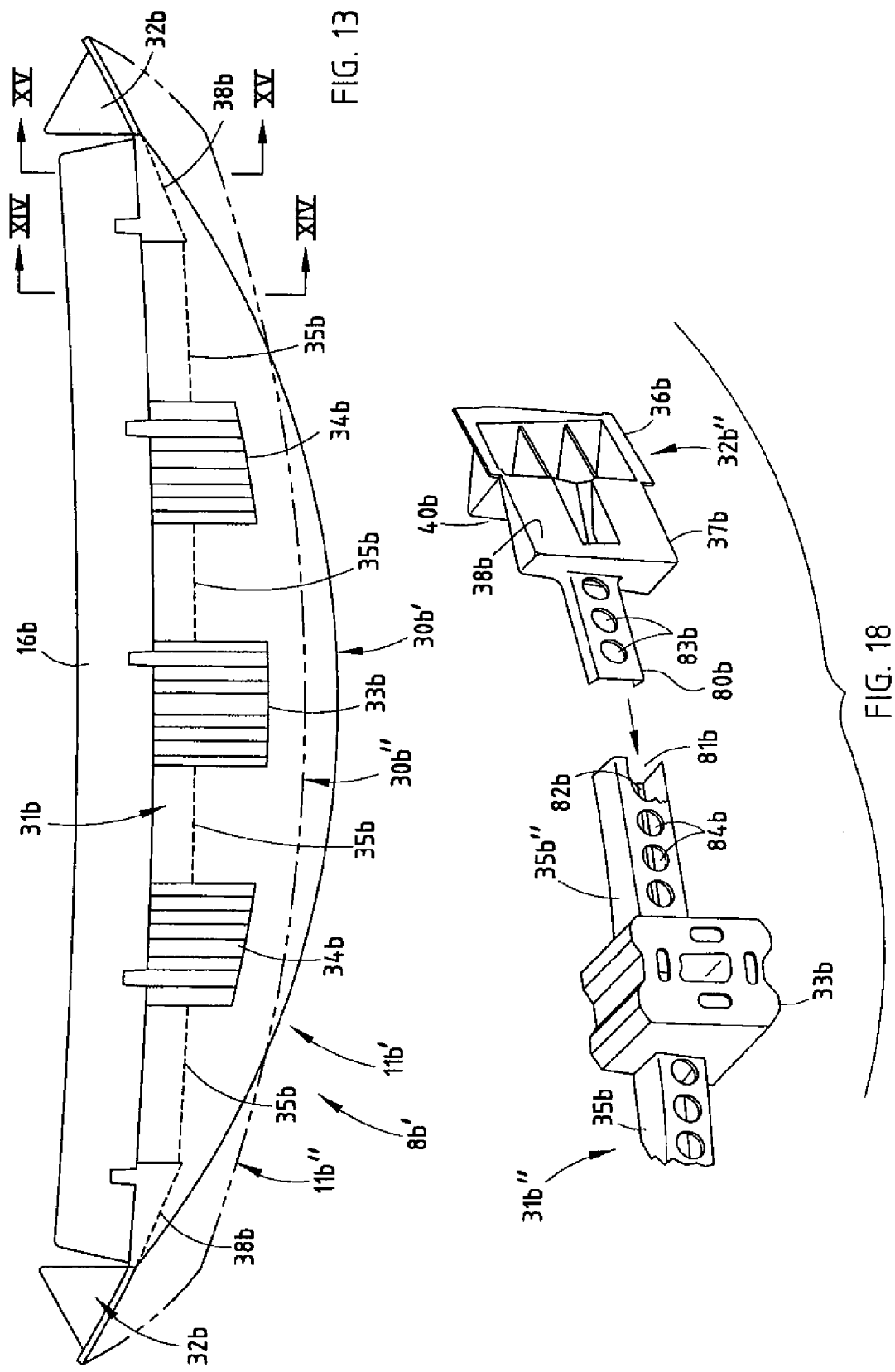

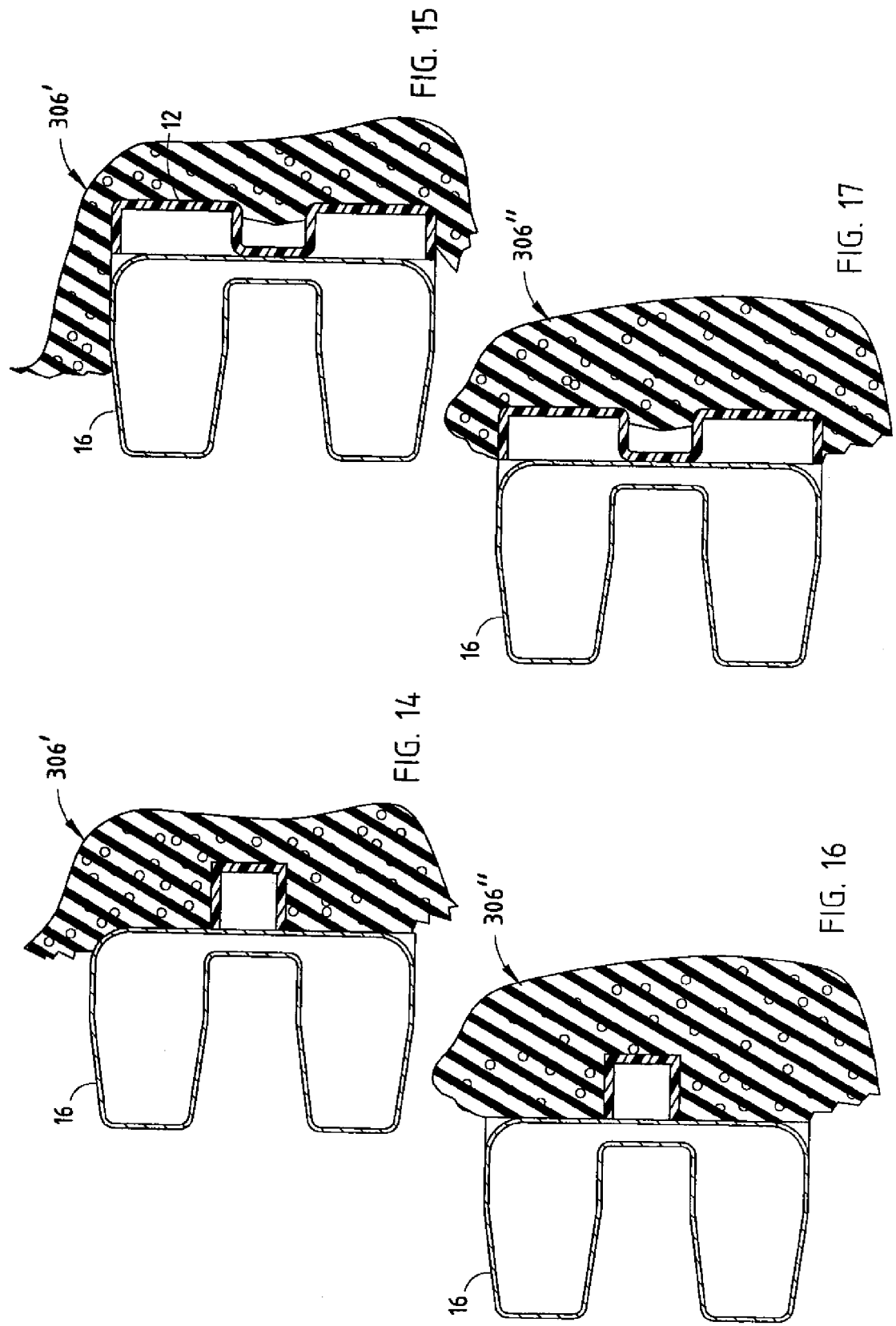

BUMPER SYSTEM WITH ENERGY ABSORBER

CROSS-REFERENCE TO RELATED APPLICATIONS

This application is a divisional of commonly assigned, co-invented application Ser. No. 11/313,325, FILED Dec. 21, 2005 entitled BUMPER SYSTEM WITH ENERGY ABSORBER, now U.S. Pat. No. 7,172,227, which is a continuation of commonly assigned, co-invented application Ser. No. 10/694,278 filed on Oct. 27, 2003, entitled BUMPER SYSTEM WITH ENERGY ABSORBER, now U.S. Pat. No. 7,052,056, which is a divisional of commonly assigned, co-invented application Ser. No. 10/163,586 filed on Jun. 6, 2002, entitled BUMPER WITH INTEGRATED FOAM AND NON-FOAM COMPONENTS, now U.S. Pat. No. 6,672,635.

BACKGROUND

The present invention relates to vehicle bumper systems having an energy absorber on a bumper beam, and more particularly relates to a bumper system having an energy absorber on the beam that is adapted to provide different levels of energy absorption in selected areas but further adapted to take maximum advantage of mass production.

Vehicle bumper systems often include a bumper beam for strength and a mounted energy absorber to help absorb energy and distribute stress across the bumper beam during impact. However, each different model vehicle requires a slightly different shape or different energy absorption profile, such that each different model vehicle requires a different mold for the energy absorber. Each additional mold is expensive, because they are relatively large and long. Further, it takes time and labor to change molds, and requires downtime of the molding machine.

Accordingly, a bumper system is desired that includes an energy absorber solving the aforementioned problems and having the aforementioned advantages.

SUMMARY OF THE PRESENT INVENTION

In one aspect of the present invention, a bumper system has a face and ends, and has an energy absorber mounted on the face. The energy absorber has an injection-molded piece and a foam piece attached to the injection-molded piece, with the injection-molded piece being one-piece with box-shaped sections interconnected by strap sections, and with the foam piece being one-piece and encapsulating the straps and engaging at least a side of the box-shaped sections.

In another aspect of the present invention, a bumper system includes a bumper beam having a face surface, and an energy absorber engaging the face surface, where the energy absorber has an elongated non-foam injection-molded component with at least three longitudinally-spaced enlarged sections. An enlarged foam component is attached to the injection-molded component, with the enlarged foam component having first foam sections positioned between the enlarged sections and having second foam sections on the enlarged sections.

In yet another aspect of the present invention, a method comprises steps of molding a non-foam plastic component having box sections and strap sections connecting the box sections, and molding a foam component that encapsulates at least three sides of the strap sections and that is bonded to at least part of the box sections, including forming a final product that can be handled as a unit. The method further includes engaging the unitary member against a face of a bumper beam.

In still another aspect of the present invention, a method comprises steps of providing molding dies for molding a non-foam plastic component having box sections interconnected with strap sections, such that the plastic component is shaped for use in a bumper system for providing an energy-absorbing impact strength, and also providing at least first and second molds for molding first and second foam components onto the plastic component, the first and second molds having respective cavities configured to form differently shaped front surfaces on the first and second foam components. The method includes molding the non-foam plastic component using the molding dies, and using the selected one mold in a molding process to form an associated one of the foam components, including attaching the associated foam component to the one of the non-foam plastic components to form a first energy absorber bumper product that can be handled as a unit. The method further includes engaging the unitary bumper product against a face of a bumper beam.

These and other aspects, objects, and features of the present invention will be understood and appreciated by those skilled in the art upon studying the following specification, claims, and appended drawings.

BRIEF DESCRIPTION OF DRAWINGS

FIG. 1 is a fragmentary perspective view of a bumper system including a bumper beam and a face-mounted energy absorber;

FIGS. 2-3 are cross sections taken along the lines II-II and III-III in FIG. 1;

FIG. 4 is a front perspective view of a second bumper system including a bumper beam and a modified face-mounted energy absorber;

FIG. 5 is a rear perspective view of the energy absorber shown in FIG. 4;

FIG. 13 is a top view of a fourth bumper system, utilizing the injection-molded non-foam plastic component shown in FIG. 12 but having first and second enlarged foam components molded thereon, the first being shown in solid lines, the second in phantom lines;

FIGS. 14-15 and FIGS. 16-17 are cross sections taken along the lines XIV-XIV and XV-XV, respectively. FIGS. 14-15 are cross sections of the embodiment shown in solid lines, and FIGS. 16-17 are cross sections of the embodiment shown in phantom lines; and FIG. 18 is an exploded view of a modified version of the non-foam component shown in FIG. 12.

DETAILED DESCRIPTION OF PREFERRED EMBODIMENTS

Figure 6:
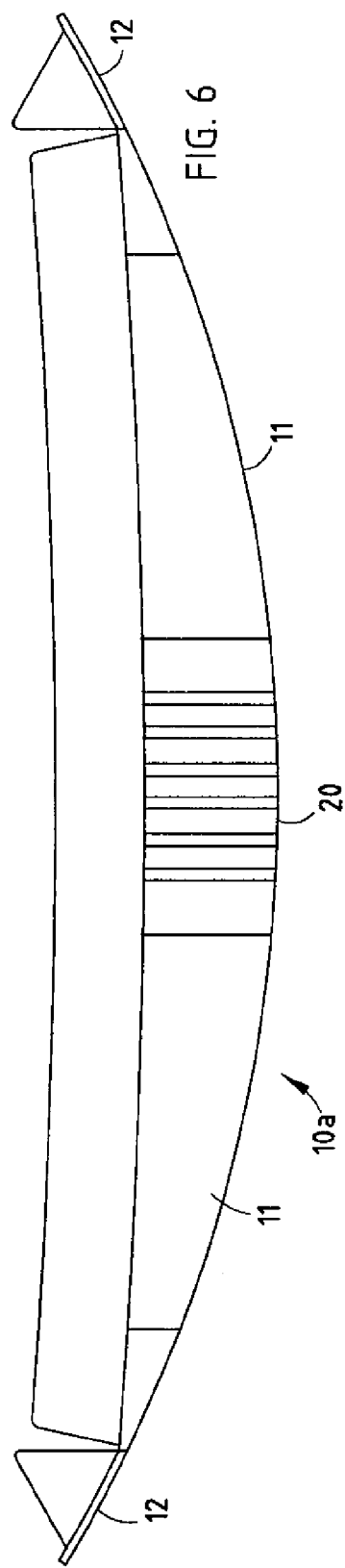
FIGS. 6-7 are top and front views of FIG. 4.
Figure 7:
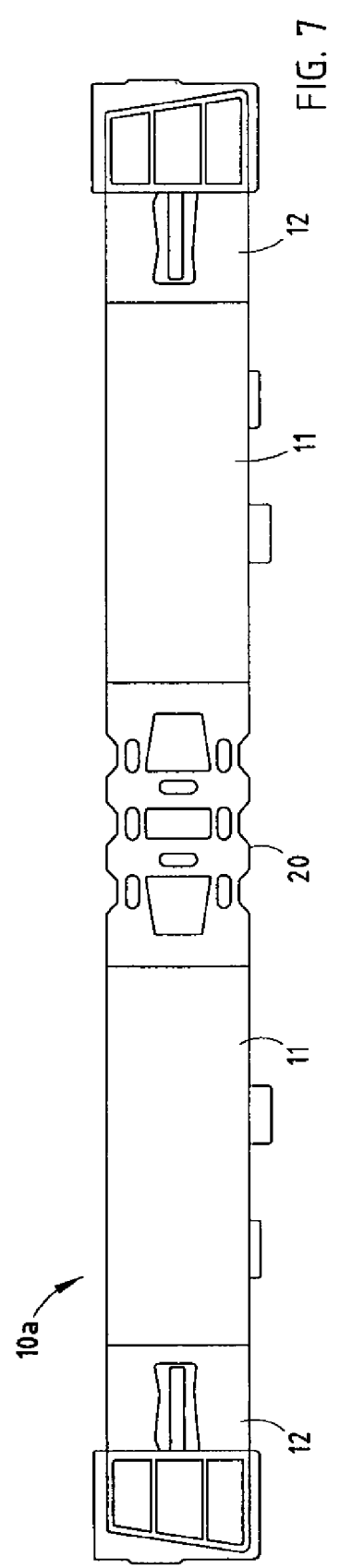

A bumper system 8 (FIG. 1) includes a bumper beam 16 having a face and ends, and an energy absorber 10 mounted on the face. The energy absorber 10 has a center-located foam piece 11 engaging the face and an injection-molded end piece 12 securely attached to each end of the foam piece and also engaging the face. By this arrangement, the energy absorber 10 is a single unit that can be handled and attached to the bumper beam 16. Also, the energy absorber 10 can include different end pieces while still using the same foam piece, or alternatively, the energy absorber can include different center pieces while using the same injection-molded non-foam end pieces. Thus, the present inventive concepts provide the advantages of smaller molding dies for molding the injection-molded non-foam components. This is important because molding dies for injection-molded components are considerably more expensive than molding dies for foam components. At the same time, the present methods and apparatus provide the advantages of a single large energy absorber component that can be handled.

More specifically, the illustrated energy absorber 10 of FIG. 1 is adapted to advantageously use a common center piece 11 made of foam, and any one of a variety of different injection-molded end pieces attached to the foam. The illustrated end piece 12 includes loops or attachment flanges 13 and is insert-molded onto an end of the foam piece 11 when forming the foam piece 11. The end piece 12 includes a front surface 14 angled to match the corner of its particular vehicle, and a notched back surface 15 shaped to mateably receive an end of the bumper beam 16 that it rides on. It is contemplated that different attachment means can be used to attach pieces 11 and 12 together, including adhesive, mechanical attachment, different tabs for insert-molding into the foam, and barb-like tabs that can be poked into the foam, etc. Since the same center piece is used for a number of different models, the overall cost of molding dies is greatly reduced. Restated, the cost of several small injection-molding dies for molding a variety of different end pieces, added to the cost of one large die for the foam center piece, is much lower than the cost of making a multitude of different huge injection-molding dies for each energy absorber.

The same principle applies to a bumper system that uses the same end pieces but different foam molding dies. Restated, the cost of a single set of small injection-molding dies for molding the end pieces, added to the cost of several large dies for making different foam center pieces, is much lower than the cost of making a multitude of different huge injection-molding dies. This concept is discussed in greater detail below. (See FIGS. 13-17, and see discussion below.)

A second energy absorber 10a (FIGS. 4-7) is mounted to a face of a bumper beam 16 and includes a center-located injection-molded non-foam plastic center piece 20, foam pieces 11 attached to each end of the center piece 20, and injection-molded non-foam end pieces 12 attached to outer ends of each of the foam pieces 11. The pieces 11, 12, and 20 are each molded for optimal localized energy absorption (i.e. for an optimal force versus deflection curve, as well as for total energy absorption based on localized/area-specific impacts and based on particular types of impacts). For example, the injection-molded pieces 12 and 20 include a plurality of interconnected webs forming a honeycomb structure capable of substantial energy absorption prior to deformation of the bumper beam itself.

Figure 8:
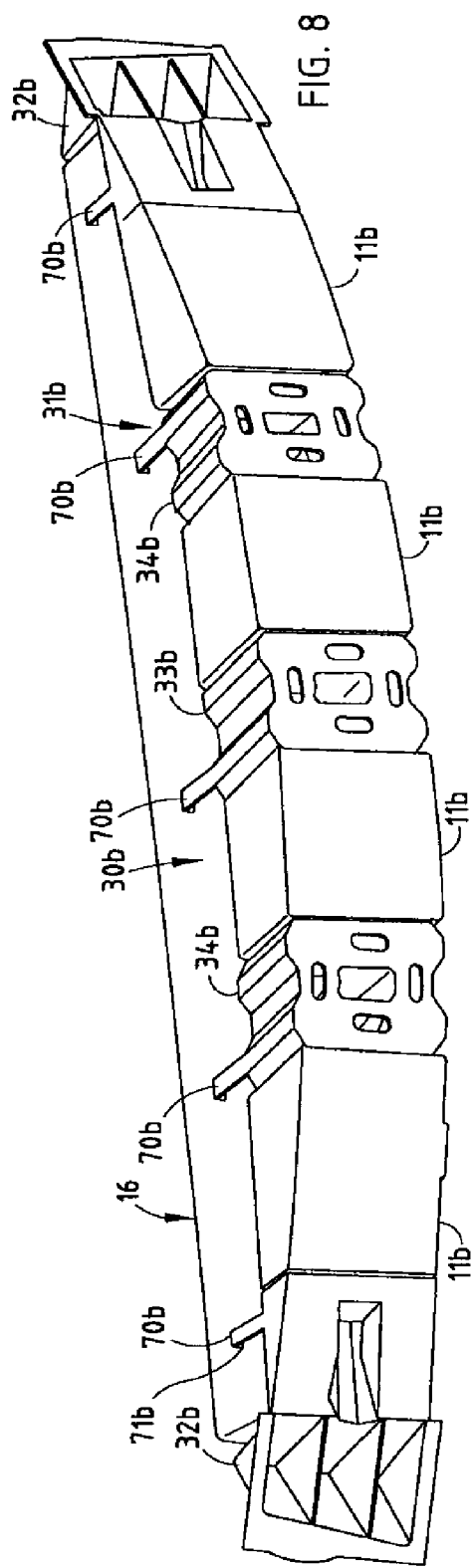
FIGS. 8-10 are front perspective, front, and top views of a third bumper system.
Figure 9:
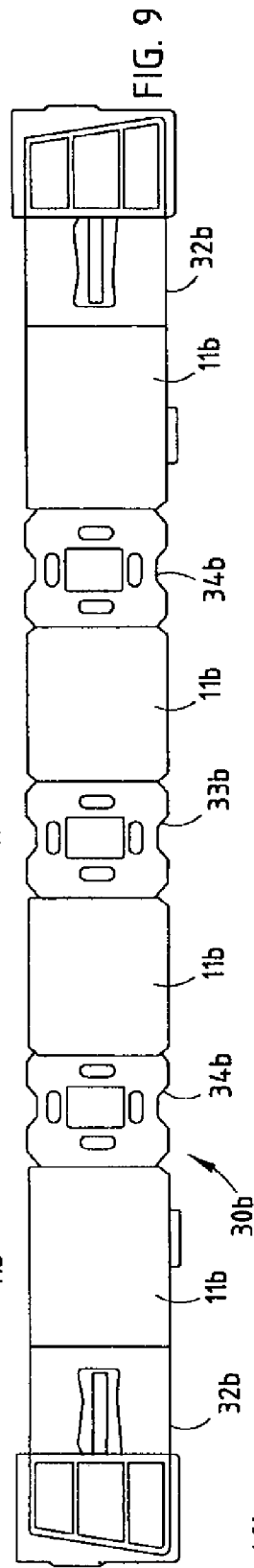
Figure 10:
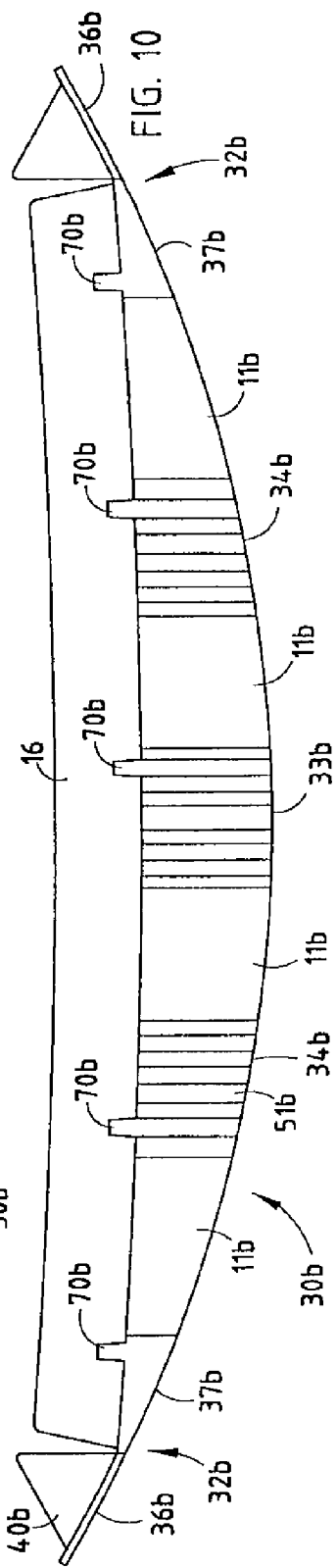
Figure 11:
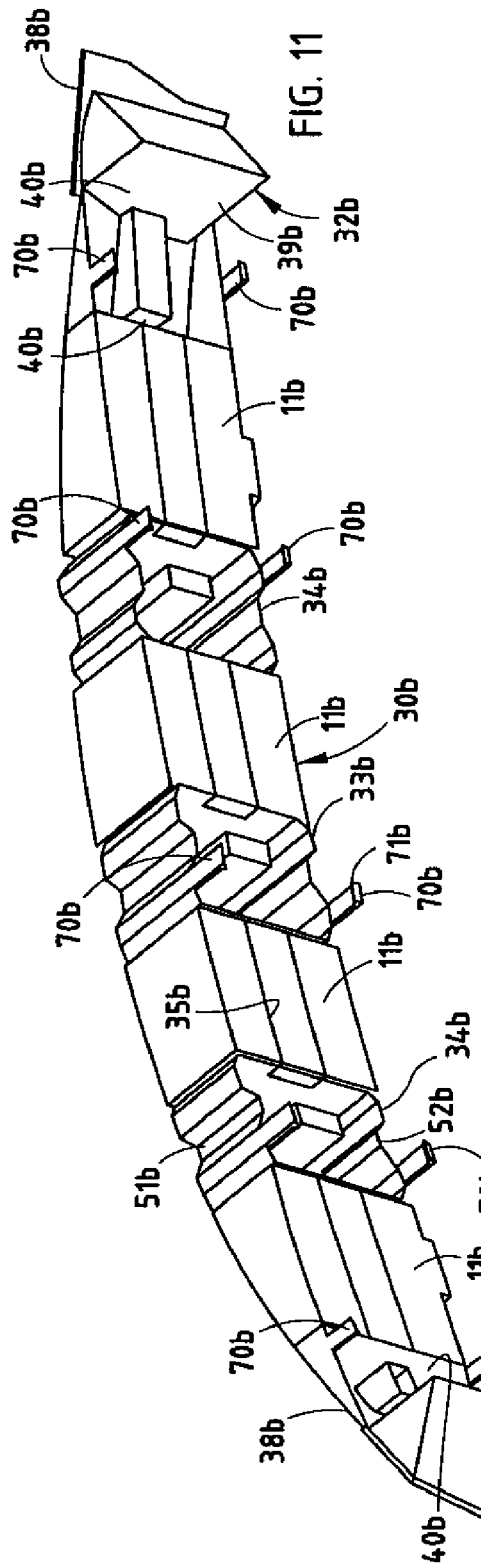
FIG. 11 is a rear perspective view of the energy absorber shown in FIG. 8.
Figure 12:
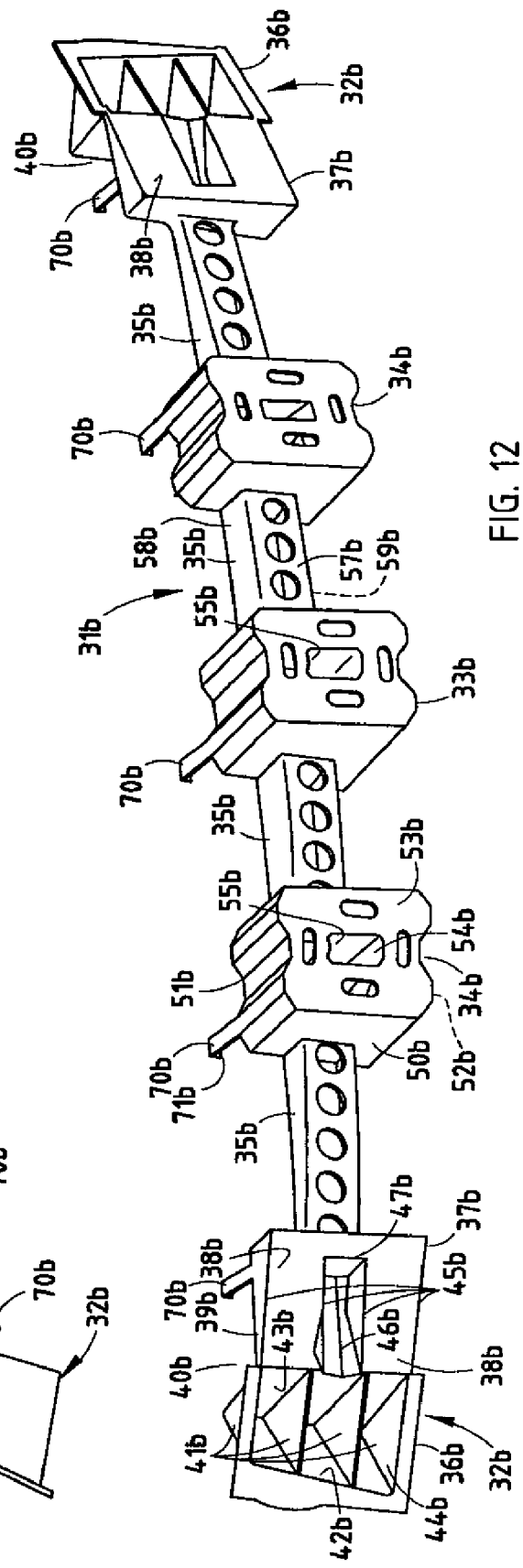
FIG. 12 is a front perspective view of an injection-molded non-foam "solid" plastic component of the energy absorber shown in FIG. 8.

A modified bumper system (FIGS. 8-10) includes a roll-formed B-shaped bumper beam 16 and a modified energy absorber 30b abutted against its face surface. The energy absorber 30b includes an injection-molded piece 31b (FIG. 12), and one or more foam pieces 11b (FIGS. 8-11) molded onto the injection-molded piece 31b. The injection-molded piece 31b (FIG. 12) is molded of a non-foam "solid" polymer and includes molded end sections 32b (similar to end pieces 12), and molded center and intermediate sections 33b and 34b, all interconnected by longitudinal straps 35b. The end sections 32b (when seen in plan view) each include a triangular outer portion 36b and a triangular inner portion 37b forming a rearwardly-swept angled front surface 38b and a stepped back surface 39b with a pocket 40b shaped to receive the end of the beam 16. The outer portion 36b includes four parallel walls 41b that extend parallel a length of the beam 16, and that combine with angled walls 42b and 43b to define a honeycomb-like structure in the form of three forwardly open pockets 44b. The inner portion 37b has four parallel walls 45b that combine with angled walls 46b and 47b to define a rigid structure on the face of the end of the bumper beam 16. The honeycomb-like structure of the outer portion 36b and the inner portion 37b combine to provide optimal energy absorption at ends of the bumper beam 16 for optimal corner impact resistance and crush characteristics. The walls 41b and 45b are generally parallel and aligned with each other and extend in a horizontal plane (when in a car-mounted position), such that good corner impact strength is provided. It is noted that the inner and outer portions 36b and 37b are configured to allow a simple molding die, without the need for making undercuts, blind surfaces, and without the need for complex die pulls and slides.

The center and intermediate sections 33b and 34b (FIG. 12) each comprise rearwardly-open box-shaped sections formed by side walls 50b, a top wall 51b, a bottom wall 52b and a front wall 53b. An opening 54b is formed in each of the front walls 53b, and a centered tubular "crush tower" of material 55b extends rearwardly from the marginal material forming the opening 54b to a rear of the energy absorber. The box-like shape of walls 50b/51b/52b/53b along with the crush tower 55b adds considerably to the impact strength of the energy absorber 30b and adds control over the crush sequence and characteristics of impact and bumper system crush stroke versus energy absorption. If the crush tower 55b ends short of the bumper beam 16, then the crush sequence has a stepped function, where the initial crush strength is a little lower, and when the energy absorber 30b crushes to the point where the crush tower 55b hits the bumper beam 16, the impact strength suddenly increases for additional crush stroke distances. Also, the top and bottom walls 51b and 52b are wavy or undulated to provide increased impact strength.

The straps 35b (FIG. 12) extend between and interconnect each of the sections 32b, 33b, and 34b. Their cross sections define a rearwardly-facing U-shape, and are formed by front wall 57b, and top and bottom walls 58b and 59b. The straps 35b permit flexing movement, until the foam sections 11b are molded onto the pieces 31b, at which time the energy absorber 30b becomes stiff enough to easily handle and assemble onto the bumper beam 16.

It is noted that the entire illustrated energy absorber 30b is configured so that it can be molded by a relatively simple molding die, where the die halves do not include draws, slides, and other moving complex components for making blind and/or hidden surfaces. This greatly simplifies and improves tooling, and reduces costs and capital investment of making the die and keeping the die maintained and operational.

The energy absorber 30b can be attached temporarily to the tubular beam 16 by various means. For example, the illustrated absorber 30b includes rearwardly-extending resilient attachment flanges or "fingers" 70b on top and bottom walls of the energy absorber 30b. The fingers 70b include a protrusion 71b adapted to engage a mating aperture in the beam 16 for temporarily securing the energy absorber 30b to the beam 16. The assembly 30b/16 can then be handled as a unit to facilitate transporting, placing, and then securing the assembly 30b/16 on the vehicle.

FIG. 13 is a top view of a fourth bumper system 8b', utilizing a modified energy absorber 30b'. The energy absorber 30b' includes the same injection-molded non-foam plastic component 31b shown in FIG. 12, but also includes an enlarged one-piece foam component 11b' (shown in solid lines) or one-piece foam component 11b" (shown in phantom lines) molded thereon. It is contemplated that the foam piece will be made unique to each different vehicle model (i.e. each different fascia style), but the injection-molded part will be the same for each vehicle model (i.e. despite the different fascia style, the same non-foam part can be used.) Advantageously, the foam component (11b' and/or 11b") can have a different top surface shape or bottom surface shape. For example, compare the energy absorber 30b' illustrated by solid lines in FIG. 13, with the energy absorber 30b" illustrated by phantom lines in FIG. 13. Also, compare the energy absorber 30b' in FIGS. 13-15, with the energy absorber 30b" in FIGS. 13, 16-17.

Energy absorber 30b' (or 30b") can be further modified as shown in FIG. 18, by making the end piece telescopingly adjustable on the main center piece. In the modification, the end piece 32b" is separated from the interconnecting section 35b" of center piece 31b", and the end piece 32b" is given an integrally-formed free-ended interconnecting leg 80b shaped to telescope into an open end 81b of the interconnecting section 35b". The interconnecting section 35b" includes inward flanges 82b shaped to capture a cross-sectional shape of the interconnecting leg 80b, and further the interconnecting leg 80b includes protrusions 83b shaped to detentingly engage the apertures 84b in the interconnecting leg 80b.

By this arrangement, the end piece 32b" can be adjustingly snap-lockingly engaged with the interconnecting section 25b to a predetermined length. Thus, the same non-foam injection-molded energy absorber assembly (i.e. center piece 31b" and end pieces 32b") can be assembled to a desired length for use on a particular model vehicle having a car-width dimension greater than that shown in FIG. 13. It is noted that the telescoping feature (i.e. leg 80b) can be located anywhere along a length of the energy absorber, and not just at its end.

It is to be understood that variations and modifications can be made on the aforementioned structure without departing from the concepts of the present invention, and further it is to be understood that such concepts are intended to be covered by the following claims unless these claims by their language expressly state otherwise.

We claim:

1. A method comprising steps of:

molding a plurality of non-foam plastic components each having box sections and strap sections connecting the box sections;

molding a foam component that encapsulates at least three sides of one of the strap sections and that is bonded to at least part of the box sections, including forming a final product that can be handled as a unit; and engaging the unitary member against a face of a bumper beam.

2. The method defined in claim 1, wherein:

the non-foam plastic component is one-piece.

3. The method defined in claim 1, wherein:

the foam component is one-piece.

4. A method comprising steps of:

providing molding dies for molding a non-foam plastic component having box sections interconnected with strap sections, such that the plastic component is shaped for use in a bumper system for providing energy-absorbing impact strength;

providing at least first and second molds for molding first and second foam components onto the plastic component, the first and second molds having respective cavities configured to form differently shaped front surfaces on the first and second foam components;

molding a plurality of the non-foam plastic components using the molding dies;

selecting one of the first and second molds;

using the selected one mold in a molding process to form an associated one of the foam components, including attaching the associated foam component to the one of the non-foam plastic components to form a first energy absorber bumper product that can be handled as a unit; and engaging the unitary bumper product against a face of a bumper beam.

5. The method defined in claim 4, further including:

selecting the other of the first and second molds, using the selected other mold to form an associated second one of the foam components, including attaching the second associated foam component to another one of the non-foam plastic components to form a second energy absorber bumper product that can be handled as a unit, the second energy absorber bumper product being different than the first energy absorber bumper product.

* * * * *